G. W. ROBERTS.
WATER LUBRICATED BEARING.
APPLICATION FILED MAR. 9, 1914.
1,126,284.
Patented Jan. 26, 1915.
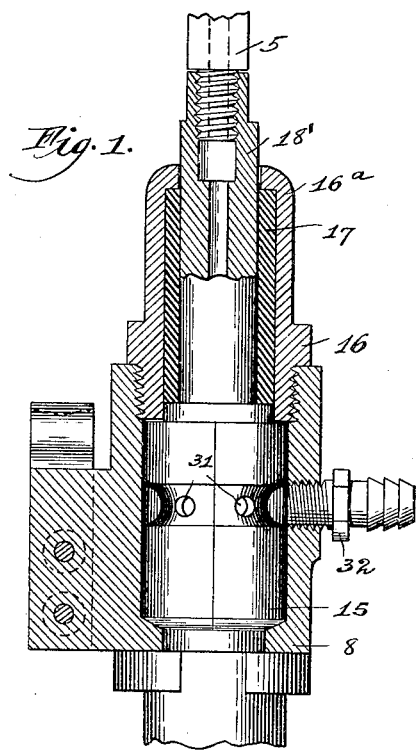
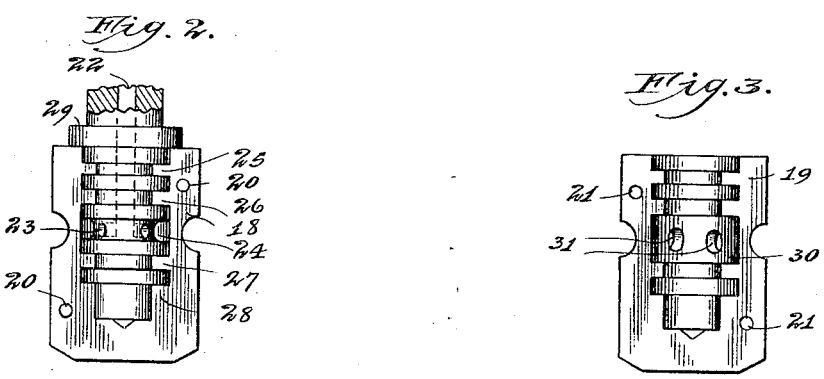
Witnesses,
Inventor,
George W. Roberts
By Offield Towle Graves & Offield
Attys.

UNITED STATES PATENT OFFICE.

GEORGE W. ROBERTS, OF CHICAGO, ILLINOIS, ASSIGNOR TO ARROW BOTTLERS COMPANY, OF CHICAGO, ILLINOIS, A CORPORATION OF WEST VIRGINIA.

WATER-LUBRICATED BEARING.

1,126,284.   Specification of Letters Patent.   Patented Jan. 26, 1915.

Application filed March 9, 1914. Serial No. 823,379.

*To all whom it may concern:*

Be it known that I, GEORGE W. ROBERTS, a citizen of the United States, residing in the city of Chicago, county of Cook, and State of Illinois, have invented certain new and useful Improvements in Water-Lubricated Bearings, of which the following is a specification.

This invention relates to improvements in water-lubricated bearings, and refers more particularly to bearings which are adapted to provide a continuous supply of water to a spindle rotating therein, and subject to thrust in different directions.

In bottle-washing and analogous machinery, it is necessary to carry a supply of water to a rotating shaft which is equipped with suitable scouring devices, the water being fed along the hollow spindle and to the brush. Usually the spindle is supported vertically in a step-bearing which is reciprocated up and down so as to bring the scouring devices into and out of contact with the objects to be cleaned.

For a number of reasons, it is desirable to supply the water to the spindle through the step-bearing, but this introduces serious difficulty in the proper lubrication of the step-bearing, since the water, which may be under considerable pressure, tends to force out the lubricant from the bearing, which thus is very apt to wear and cause a serious leakage of water out of the bearing.

The salient objects of the present invention are to provide a bearing of the class described which is lubricated solely by the water supplied to the spindle; to provide a bearing of the class described in which the leakage of water along the spindle and out of the bearing is reduced to a minimum; to provide a bearing of the class described which may be assembled and replaced by inexperienced help and without the danger of obtaining a faulty adjustment; to provide a bearing of the class described in which friction is reduced to a minimum, but yet in which ample bearing surface is provided to insure indefinite life of the wearing surfaces; to provide a bearing of the class described which shall be simple and economical of construction; and in general to provide an improved water-lubricated bearing of the character referred to.

My invention consists in the matters hereinafter described and more particularly pointed out in the accompanying drawings, in which,—

Figure 1 is an axial section taken through the step-bearing; Fig. 2 shows one-half of the brass with the spindle in place, the end thereof being broken away; and Fig. 3 is a view of the other half of the bearing brass.

Referring now to the step-bearing, the casting 8, which constitutes the casing, is provided with a central cylindrical aperture, which contains the bearing proper 15. The latter is securely held in place in the casting 8 by means of a locking nut 16, the outer upper end of which is extended to receive the bushing 17. The bearing 15 is divided into two halves 18 and 19, which are fitted together by means of dowel pins 20 and dowel holes 21. The object of making the bearing 15 in two pieces is to permit the insertion of the bearing end 18' of the rotating spindle. The latter, as seen from an inspection of Fig. 2, has drilled therein a longitudinal water passage 22, the lower end of which communicates with four radial orifices 23 leading to a groove 24 in the exterior of the spindle. The groove 24 is located substantially in the center of the bearing length of the spindle, which is turned out circumferentially at 25, 26, 27 and 28 in order to furnish a number of bearing surfaces of comparatively small area individually, but in the aggregate amounting to quite a large wearing surface. The two halves of the bearing 15 are bored out so as to correspond with the grooved end of the spindle 18', which is also furnished with an integral collar 29 running within the bore of the locking nut 16. It should here be noted that in boring out the brasses the central portion 30 of the bore is made cylindrical so as to form an annular space for water to flow around the groove 24 in the spindle. The bearing 15 is also grooved out around its circumference so as to furnish an annular water space within the bore of the casting 8; the central cavity 30 and the annular groove in the bearing 15 being connected by four radial apertures 31. At the right point in the side of the casting 8 to effect register with the annular groove in the bearing 15 is placed a water connection 32, which is adapted to receive a flexible rubber tube communicating with a supply of water at suitable pressure. The spindle 5 is also bored out longitudinally to form a water passage, and is threaded at its lower end to screw into the upper extension of the member 18. The end of the latter is made square so as to permit the application of a wrench when screwing the member 5 into connection.

The construction of my improved bearing can be readily understood from the above description. The supply of water passes from the water connection 32 into the circumferential groove in the step-bearing 15, thence through the radial holes in the latter to the circumferential water-space provided by the groove in the spindle, and thence through the radial holes in the spindle to the longitudinal water-passage in the spindle, up through the latter and its extension 5, and out of the upper end of the spindle to the washing devices. Owing to the friction of the various parts and the mechanical drag of some of the reciprocatory elements, I have found that the bearing 15 is subjected to end thrust in alternate directions, depending upon whether the spindle is being moved in an upward or a downward direction, and this end thrust is sometimes of considerable magnitude. With my improved bearing the water itself operates as a lubricant, and there is no necessity to provide oil or grease to reduce friction. The object of admitting the water to the middle of the bearing length is to insure an equal distribution of the water supply throughout the length of the bearing. This also permits the journal to reciprocate slightly in the bearing as the direction of thrust changes, and so allows water to pass freely to all parts of the bearing surfaces. In fact, the spindle "floats" upon the film of water occurring between the multiple bearing surfaces of the spindle and its bearing. The multiple bearing grooves in the spindle also aid in preventing undue leakage of water by forcing the water to travel through a long tortuous passage of comparatively small area before it can pass out of the bearing.

In order to make the upper end of the step-bearing still more water-tight, the gland-bushing 17 is made very long and is constructed of lignum vitæ, which furnishes an excellent bearing for the spindle and at the same time expands just enough under the action of the water so as to completely occupy the space between the spindle and the shell 16ª when the bearing is in use. No other material which I have ever used or discovered gives anything like the same results as lignum vitæ for this purpose in a water-lubricated bearing. The combined effect of the multiple grooved spindle and of the long lignum vitæ bushing entirely obviates the necessity of providing adjustable stuffing-boxes, and skilled help to keep the latter in proper adjustment.

I do not wish to be limited to the details of construction shown except as specified in the appended claims.

I claim:

1. In a water-lubricated bearing, the combination of a rotating spindle provided with multiple bearing surfaces adapted to receive thrust in two different directions, a longitudinal water passage and a conduit communicating therewith, a bearing for said spindle provided with an annular space around said spindle and registering with said conduit, a groove in the outer circumference of the bearing, a conduit connecting said groove with the inner annular space, and an outer casing provided with means for supplying water to said groove in the bearing.

2. In a water-lubricated step-bearing, the combination with a spindle provided with multiple bearing surfaces adapted to receive thrust in alternate opposed directions, a bearing for said spindle, an outer casing, said casing being provided with a circumferential water-space between the bearing and the casing, said bearing being provided with an inner annular space between the bearing and the spindle, and a conduit between both of said spaces, and said spindle being provided with a longitudinal water-passage communicating with said inner annular space.

3. In a water-lubricated step-bearing, the combination of a spindle provided with multiple bearing surfaces adapted to receive thrust in alternate opposed directions, a bearing for said spindle, and an outer casing, said casing being provided with an outer conduit, said bearing being provided with an inner annular space between the bearing and the spindle, and a conduit between the inner space and the outer conduit, and said spindle being provided with a longitudinal water-passage communicating with said inner annular space.

4. In a water-lubricated bearing, the combination of a hollow spindle having a journal end provided with bearing grooves and adapted to receive end thrust in alternate opposed directions, and provided with a conduit leading from the hole in the spindle to a point substantially in the middle of the length of the journal, a split bearing for said journal provided with an annular space between the journal and the bearing at a point in register with the conduit in said spindle, and having a conduit leading from said annular space, an outer casing for said bearing provided with means for admitting a supply of water to said bearing-conduit and bored out to receive said bearing, and a lock nut adapted to clamp said bearing in the casing, and provided with a gland-bearing for the projecting end of said spindle.

GEORGE W. ROBERTS.

Witnesses:
HELEN N. SMITH,
ALEX McLAREN.

Copies of this patent may be obtained for five cents each, by addressing the "Commissioner of Patents, Washington, D. C."